(12) United States Patent
Behrends et al.

(10) Patent No.: US 9,287,873 B2
(45) Date of Patent: Mar. 15, 2016

(54) LEVEL SHIFTER FOR A TIME-VARYING INPUT

(71) Applicant: International Business Machines Corporation, Armonk, NY (US)

(72) Inventors: Derick G. Behrends, Rochester, MN (US); Todd A. Christensen, Rochester, MN (US); Travis R. Hebig, Rochester, MN (US); Michael Launsbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/463,829

(22) Filed: Aug. 20, 2014

(65) Prior Publication Data

US 2015/0349779 A1  Dec. 3, 2015

Related U.S. Application Data

(63) Continuation of application No. 14/293,074, filed on Jun. 2, 2014.

(51) Int. Cl.
*H03K 19/018* (2006.01)
*H03K 19/0185* (2006.01)

(52) U.S. Cl.
CPC ............... *H03K 19/018521* (2013.01)

(58) Field of Classification Search
CPC .......... H03K 19/018521; H03K 5/003; H03K 5/007; H03K 3/356113
USPC ........................................................ 327/333
See application file for complete search history.

(56) References Cited

U.S. PATENT DOCUMENTS

| | | | |
|---|---|---|---|
| 4,906,871 A | 3/1990 | Iida | |
| 5,148,059 A | 9/1992 | Chen et al. | |
| 7,170,949 B2 | 1/2007 | Schoenborn | |
| 7,183,817 B2 | 2/2007 | Sanchez et al. | |
| 7,511,554 B2 | 3/2009 | Kaneko et al. | |
| 7,750,687 B2 | 7/2010 | Muhlbacher et al. | |
| 2009/0195291 A1* | 8/2009 | Tsuchi | 327/333 |
| 2012/0223765 A1 | 9/2012 | Wang et al. | |
| 2012/0235728 A1 | 9/2012 | Roth et al. | |

OTHER PUBLICATIONS

Behrends et al, "Level Shifter for a Time-Varying Input", U.S. Appl. No. 14/293,074, filed Jun. 2, 2014.
List of IBM Patents or Patent Applications Treated as Related.

* cited by examiner

*Primary Examiner* — John Poos
(74) *Attorney, Agent, or Firm* — Richard A. Wilhelm; Robert Williams (57) ABSTRACT

A level shifter circuit for coupling a first circuit, that uses a first supply voltage, with a second circuit, that uses a second supply voltage, includes an input node to receive an input signal and an output node to output to a level-shifted output signal corresponding with the input signal. An idle state on the input node corresponds with a particular binary logic value that is maintained for a first time period, and which is detected by a detection sub-circuit. Further, the level shifter circuit includes a first inverter that uses the second supply voltage, and has a feedback path between the input and output of the first inverter. The feedback path includes a first resistive element and a first transmission gate. The first transmission gate is configurable to open the feedback path when the detection sub-circuit detects an idle state on the input node of the level shifter circuit.

6 Claims, 6 Drawing Sheets

LEVEL SHIFTER FOR A TIME-VARYING INPUT

BACKGROUND

The present disclosure relates to level shifting circuits for shifting a voltage from one voltage level to another level and, more particularly, to level shifting circuits for shifting a time-varying input voltage.

In analog circuits, input and output voltages can be any value in a range. In contrast, the input and output voltages in digital logic circuits are required to be one of two values corresponding with a logic one or a logic zero. For example, five volts may correspond with a logic one and zero volts may correspond with a logic zero. This example is a simplification because precise voltages are not readily attainable in practical circuits and some tolerance is allowed. As an example, any voltage between 3.5 and 5.0 volts might correspond with a logic one and any voltage between 0.0 and 0.8 volts might correspond with a logic zero. The voltage ranges for logic levels can also be expressed in terms of a supply voltage. For example, a voltage that is 70 to 100 percent of the supply voltage might correspond with a logic one, while a voltage that is zero to 16 percent of the supply voltage might correspond with a logic zero. Different logic families and different technologies use different supply voltages. It is common in the art to refer to the voltage levels for a particular logic family and technology using a single value, i.e., the voltage level corresponding with the logic one. For example, a digital logic circuit may be described as 5V, 3.3V, or 1.7V logic.

Known circuits use a variety of voltage levels. Circuits using new voltages levels are introduced from time to time. A first digital logic circuit that uses a first voltage level can have a need to communicate with a second digital logic circuit that uses a second, different voltage level. Accordingly, a circuit at the interface between the first and second digital logic circuits that shifts the voltage levels used by one circuit to the voltages levels used by the other circuit enables the two circuits to communicate.

Digital logic circuits may use metal oxide semiconductor field-effect (MOSFET or MOS) transistors. MOSFET transistors may be n-channel MOSFETS (NMOS) or p-channel MOSFETS (PMOS). In addition, digital logic circuits may use complementary metal oxide semiconductor (CMOS) technology. In CMOS technology, both NMOS and PMOS transistors are present.

SUMMARY

Various embodiments of the present disclosure are directed to a level shifter circuit for coupling a first circuit with a second circuit, where the first circuit uses a first supply voltage and the second circuit uses a second supply voltage. According to various embodiments, the level shifter circuit includes an input node to receive an input signal and an output node to output to a level-shifted output signal corresponding with the input signal. In addition, the level shifter circuit includes a detection sub-circuit to detect an idle state on the input node. An idle state is a state that corresponds with a particular binary logic value that is maintained for a first time period. Further, the level shifter circuit includes a first inverter that uses the second supply voltage. The first inverter has an input and an output. The level shifter circuit also includes a feedback path between the input and output of the first inverter. The feedback path includes a first resistive element and a first transmission gate. The first transmission gate is configurable to open the feedback path when the detection sub-circuit detects an idle state on the input node of the level shifter circuit.

In various embodiments, the detection sub-circuit can include a capacitive element and a second resistive element. The first time period of the idle state is determined by the capacitive element and the second resistive element. In various embodiments, the detection sub-circuit includes a second resistive element having a first and a second node, and a capacitive element. The capacitive element is connected between the first node and a negative rail of a supply voltage. In addition, the detection sub-circuit can include a first switching device serially connected between the second node and a positive rail of the supply voltage. For example, the first switching device can be a PFET pull-up stack. Further, the detection sub-circuit can include a second switching device connected between the first node and the negative rail of the supply voltage, and in parallel with the capacitive element. For example, the second switching device can be an NFET. When the first switching device is closed, the capacitive element, the second resistive element, and the first switching device are serially connected between positive and negative rails of a supply voltage to provide a path to charge the capacitive element. Moreover, when the second switching device is closed, the second switching device is connected between the first node and the negative rail of the supply voltage, providing a path to discharge the capacitive element. The first and second switching devices are operated by the input signal on the input node, such that when the first switching device is open, the second switching device is closed. Additionally, the voltage at the first node, which may be referred to as a "shutoff node," provides an indication as to whether the input node is in the idle state.

According to various embodiments of the level shifter circuit, the input of the first inverter is coupled with a multiplexer, the multiplexer being configurable to select a first or a second input signal. Additionally, the first input signal is input to the input node of the level shifter circuit and the multiplexer is configured to select the second input signal when the detection sub-circuit detects an idle state on the input node.

In various embodiments, the level shifter circuit can include a control signal generation sub-circuit to generate a control signal in response to detection of the idle state on the input node.

An idle state is a state that corresponds with a particular binary logic value that is maintained for a first time period. The particular binary logic value can either a logic one or a logic zero.

In various embodiments, the level shifter circuit includes a capacitive element coupled between the input node and the input of the first inverter. The capacitive element is configured to pass an AC component of the input signal and to block a DC component of the input signal.

Additional embodiments are directed to methods and design structures for a level shifter circuit for coupling a first circuit with a second circuit, where the first circuit uses a first supply voltage and the second circuit uses a second supply voltage.

The above summary is not intended to describe each illustrated embodiment or every implementation of the present disclosure.

BRIEF DESCRIPTION OF THE DRAWINGS

The same numbers may be used in the Figures and the Detailed Description to refer to the same devices, parts, components, steps, operations, and the like.

While the concepts and embodiments described in this disclosure are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the invention.

DETAILED DESCRIPTION

Aspects of this disclosure relate to level shifting circuits for shifting a voltage from one voltage level to another level and, more particularly, to level shifting circuits for shifting a time-varying input voltage. While the present disclosure is not necessarily limited to such applications, various aspects of the disclosure may be appreciated through a discussion of various examples using this context.

Figure 1:
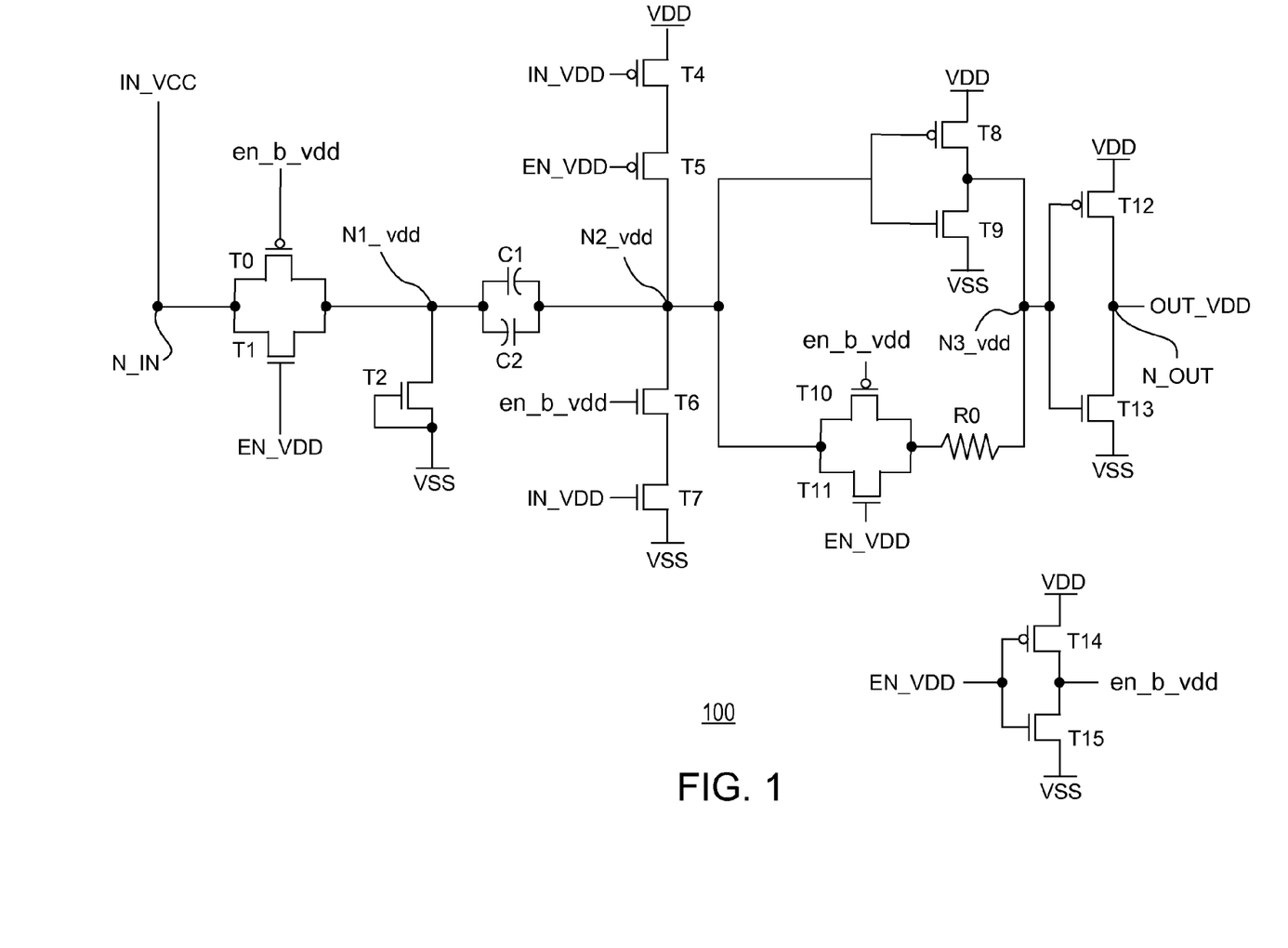
FIG. 1 depicts an AC level shifter circuit according to various embodiments.

FIG. 1 depicts an AC level shifter circuit 100 for level shifting a time-varying input signal according to various embodiments. An example of a time-varying input signal is an input signal that may be either a high voltage corresponding with a logic one or a low voltage corresponding with a logic zero. The time periods between transitions from a high-to-low voltage and low-to-high voltage of an input signal may vary. A time-varying input signal may transition with every clock cycle or may transition only after a relatively long time period. A time-varying input signal may transition only after a relatively long time period because the input is a sequence of unchanging digital values. In addition, a time-varying input signal may transition only after a relatively long time period because the input is inactive or idle. When the time-varying input signal is idle for relatively long time period, the AC level shifter circuit 100 can consume a large amount of power due to DC current paths.

The circuit 100 level shifts a time-varying input signal IN_VCC to a time-varying output signal OUT_VDD. In particular, the circuit 100 level shifts a time-varying input signal IN_VCC that is output from a first digital logic circuit (not shown) that uses VCC as a supply voltage. The circuit 100 level shifts the input signal to the output signal OUT_VDD that can be provided to a second digital logic circuit (not shown) that uses VDD as a supply voltage. In the example of FIG. 1, a first voltage level of the first circuit is less than a second voltage level of the second circuit, e.g. VCC=0.8V<VDD=1.1V. Accordingly, one example of the circuit 100 up-shifts the input signal. In other examples, the circuit 100 is capable of down-shifting the input signal.

As shown in FIG. 1, the AC level shifter circuit 100 includes several reference nodes that are helpful for describing the structure and function of the circuit. Scanning the figure from left to right, these nodes include: input node N_IN, node N1_vdd, node N2_vdd, node N3_vdd, and output node N_OUT.

Still referring to FIG. 1 and again scanning the figure from left to right, the circuit 100 includes a first transmission gate constructed from parallelly arranged PMOS transistor T0 and NMOS transistor T1. The first transmission gate T0/T1 has a first terminal connected to input node N_IN and a second terminal connected to node N1_vdd. The input signal IN_VCC is input to the first transmission gate. The first transmission gate T0/T1 is enabled when EN_VDD is high and its complement en_b_vdd is low.

The circuit 100 includes an NMOS transistor T2, having both gate terminal and a source/drain terminal coupled to VSS, and capacitors C1 and C2. The capacitors C1 and C2 are DC blocking or AC coupling capacitors. The transistor T2 provides additional DC blocking capacitance. In an embodiment, the capacitors C1 and C2 may each have capacitance of approximately 7 nF. However, as one of ordinary skill in the art will understand, the quantity of capacitance may be adjusted in various embodiments depending on the application. In addition, the number and types of devices used to provide DC blocking capacitance may vary in different embodiments.

The circuit 100 includes PMOS transistors T4 and T5, and NMOS transistors T6 and T7. As shown in FIG. 1, the transistors T4, T5, T6, and T7 are serially connected between VDD and VSS. The transistors T4, T5, T6, and T7 function as a multiplexer that selects between IN_VCC (post coupling capacitors C1, C2) as one input and IN_VDD as a second input. The control signals EN_VDD and its complement en_b_vdd serve to select one of the two inputs. When EN_VDD is high and en_b_vdd is low, the first transmission gate T0/T1 is enabled, transistors T5 and T6 are off, and the input IN_VCC is selected. When IN_VCC is the selected input, the AC component of the signal is present on the node N2_vdd. When EN_VDD is low and en_b_vdd is high, the first transmission gate T0/T1 is disabled, transistors T5 and T6 are on, and IN_VDD is the selected input. When IN_VDD is the selected input, the IN_VDD signal may be present on the gates of both transistor T4 and T7. Depending on whether IN_VDD is high or low, IN_VDD will turn on one of the two transistors T4, T7, while turning off the other transistor.

The circuit 100 includes a first inverter constructed from PMOS transistor T8 and NMOS transistor T9, which are serially arranged between VDD and VSS. The input of first inverter T8/T9 is the node N2_vdd. The output of first inverter T8/T9 is the node N3_vdd. In addition, the circuit 100 includes a feedback resistor R0 and a second transmission gate constructed from parallelly arranged PMOS transistor T10 and NMOS transistor T11. The second transmission gate T10/T11 has a first terminal connected to input node N2_vdd and a second terminal connected to feedback resistor R0. Like the first transmission gate T0/T1, the second transmission gate T10/T11 is enabled when EN_VDD is high and its complement en_b_vdd is low. As shown in FIG. 1, the resistor R0 and second transmission gate T10/T11 are arranged in series. As also shown in FIG. 1, the (a) first inverter T8/T9, and the (b) serially connected feedback resistor R0 and second transmission gate T10/T11 are arranged in parallel between the nodes N2_vdd and N3_vdd. The feedback resistor R0 and second transmission gate T10/T11 serve as a feedback path between the output and input of the first inverter T8/T9.

As may be seen at the right side of FIG. 1, the circuit 100 includes a second inverter constructed from PMOS transistor T12 and NMOS transistor T13, which are serially arranged between VDD and VSS. The input of the second inverter T12/T13 is node N3_vdd. The output of the second inverter T12/T13 is output node OUT_VDD.

FIG. 1 also depicts a third inverter constructed from PMOS transistor T14 and NMOS transistor T15, which are serially arranged between VDD and VSS. The input of the third inverter T14/T15 is the EN_VDD control signal. The output of the third inverter T14/T15 is the complement en_b_vdd.

Figure 2:
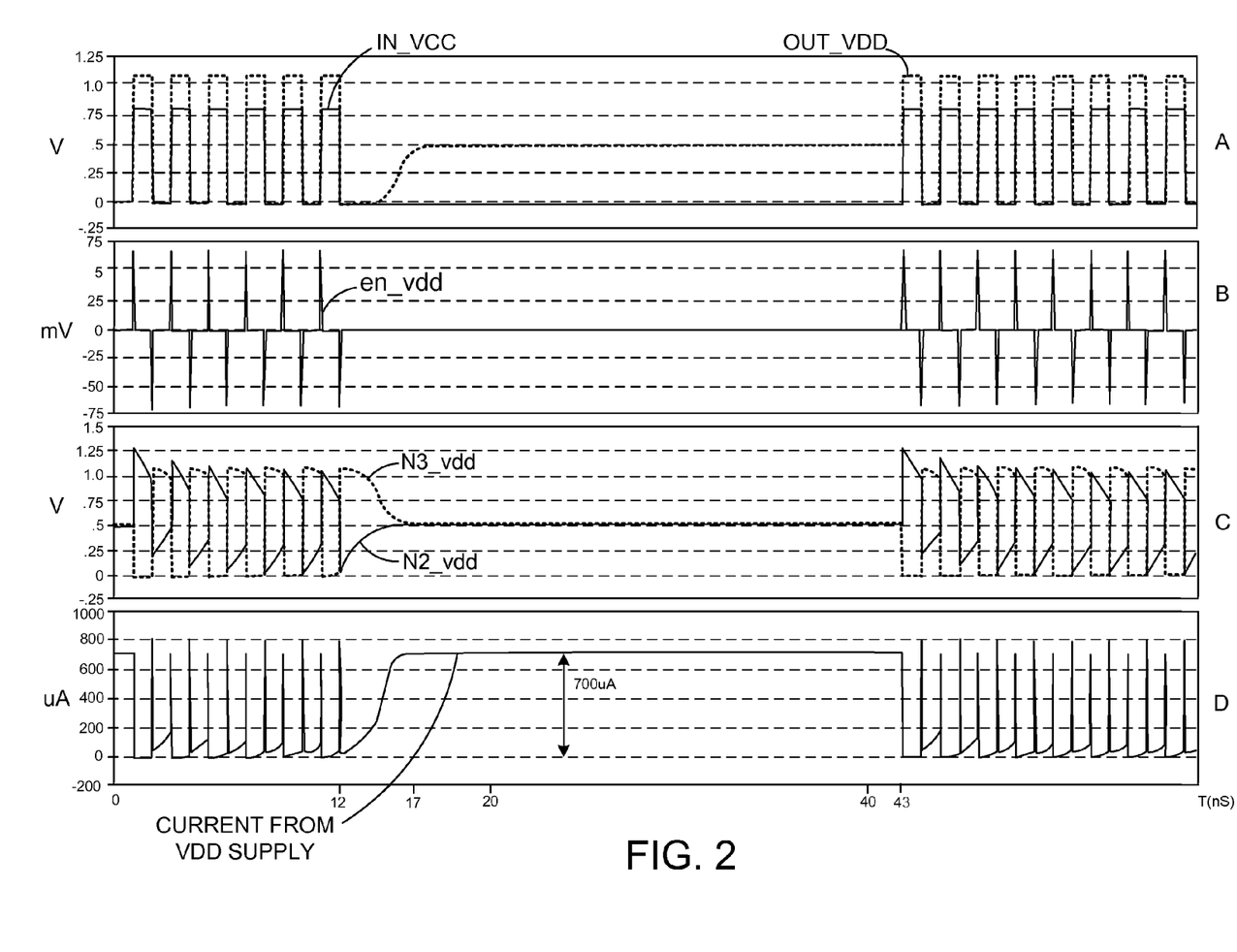
FIG. 2 depicts various waveforms for the circuit of FIG. 1 according to various embodiments.

Operation of the circuit 100 is next described with reference to FIGS. 1 and 2. In operation, when the control signal EN_VDD is high, the circuit 100 is in a level-shifting mode. FIG. 2 depicts various waveforms for a simulation of the circuit of FIG. 1 when the circuit 100 is in the level-shifting mode. When EN_VDD is high, the first transmission gate T0/T1 is enabled, and T5 and T6 are off, so that the multiplexer selects IN_VCC as the input. In addition, when EN_VDD is high, the second transmission gate T10/T11 is enabled, which opens the feedback path between the output and input of the first inverter T8/T9. In the level-shifting mode, the AC component of the input signal IN_VCC will be present at node N2_vdd, which is also the input to the first inverter T8/T9. The AC component of the input signal IN_VCC will be inverted by the first inverter T8/T9. Because the supply rails of the first inverter T8/T9 are VDD and VSS, the voltage level of the inverted copy of the input signal IN_VCC will be level shifted from the VCC domain. The level shifted copy present on node N3_vdd is input to the second inverter T12/T13. The second inverter T12/T13 inverts the level-shifted signal, restoring it to its original logic value. Diagram A of FIG. 2 shows the input signal IN_VCC and the output signal OUT_VDD. It can be seen when the input signal IN_VCC is a logic one, the voltage is approximately 0.8V. And when the output signal OUT_VDD is a logic one, the voltage is approximately 1.1V.

Under normal operating conditions when the circuit 100 is in level-shifting mode, the IN_VCC input to the level shifter will be switching regularly. The AC component of the input drives inverter T8/T9, which is powered from the VDD supply. The output of inverter T8/T9 is fed back to the input of the inverter through resistor R0. This feedback effectively sets the DC level at node N2_vdd to VDD/2. As long as there is switching activity on the input, the AC component on node N2_vdd will keep the input to the first inverter T8/T9 from reaching a VDD/2 steady state, which would cause a high crowbar current coming from the first and second inverters.

Referring to diagram A of FIG. 2, it can be seen that when the input signal IN_VCC goes idle at about 12 ns, the output signal OUT_VDD settles at about VDD/2 (about 0.5V) at about 17 ns. As long as is the input IN_VCC is switching, the voltage on node N2_vdd oscillates, as shown in diagram C of FIG. 2. However, when the input IN_VCC is idle, the feedback path through resistor R0 will cause the DC level at node N2_vdd to effectively settle at about VDD/2, as shown in diagram C of FIG. 2. When the input is idle, both the input and output of first inverter T8/T9 at nodes N2_vdd and N3_vdd, and the output of the second inverter T12/T13 at node N_OUT (output signal OUT_VDD), all settle at about VDD/2 (about 0.5V), as can be seen in diagrams A and C of FIG. 2. Diagram B of FIG. 2 depicts switching activity.

Referring to diagram D, a problem can be seen when the input stops switching. Diagram D of FIG. 2 shows current in the VDD power supply. When the input stops switching, there is no longer an AC component at node N2_vdd. It can be seen that when the input is idle the node N2_vdd is driven to a constant state of about VDD/2. With the gates of transistors T8 and T9 at about VDD/2, neither transistor is off. In other words, both transistors T8 and T9 are at least partially on, causing a current to flow between VDD and VSS. One of ordinary skill in art will recognize that a current of this type is referred to as a DC or "crowbar" current. Moreover, in addition to crowbar current in the first inverter T8/T9, the voltage on N3_vdd at about VDD/2 will cause crowbar current in the second inverter T12/T13 for the same reason. As can be seen diagram D of FIG. 2, the power supply VDD draws around 700 μA of current from about 15 ns until the input IN_VCC starts switching again at about 43 nS. In addition to the relatively large power draw, there may be an electro-migration problem.

Figure 3A:
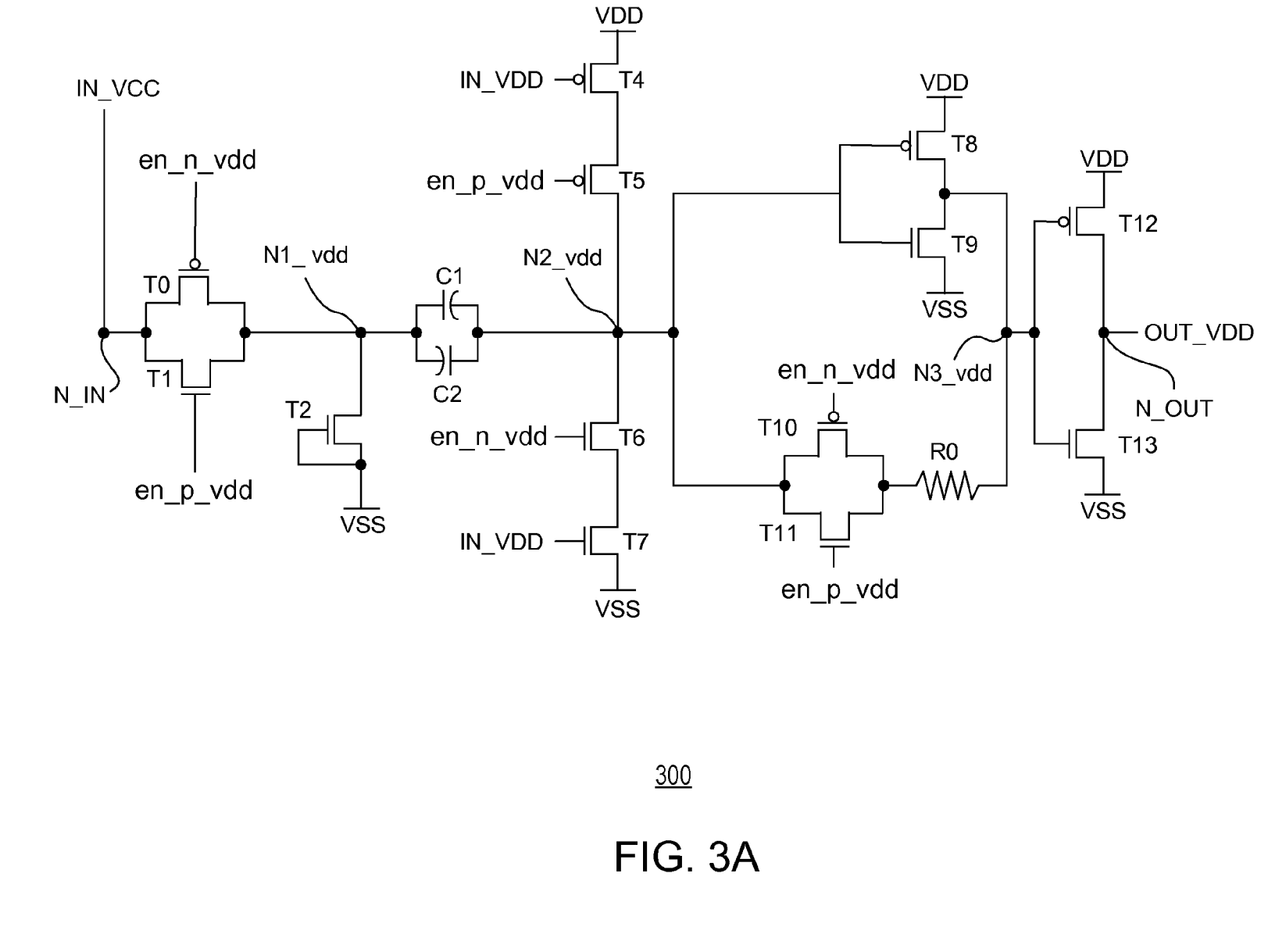
FIGS. 3A and 3B depict an AC level shifter circuit according to various embodiments.
Figure 3B:
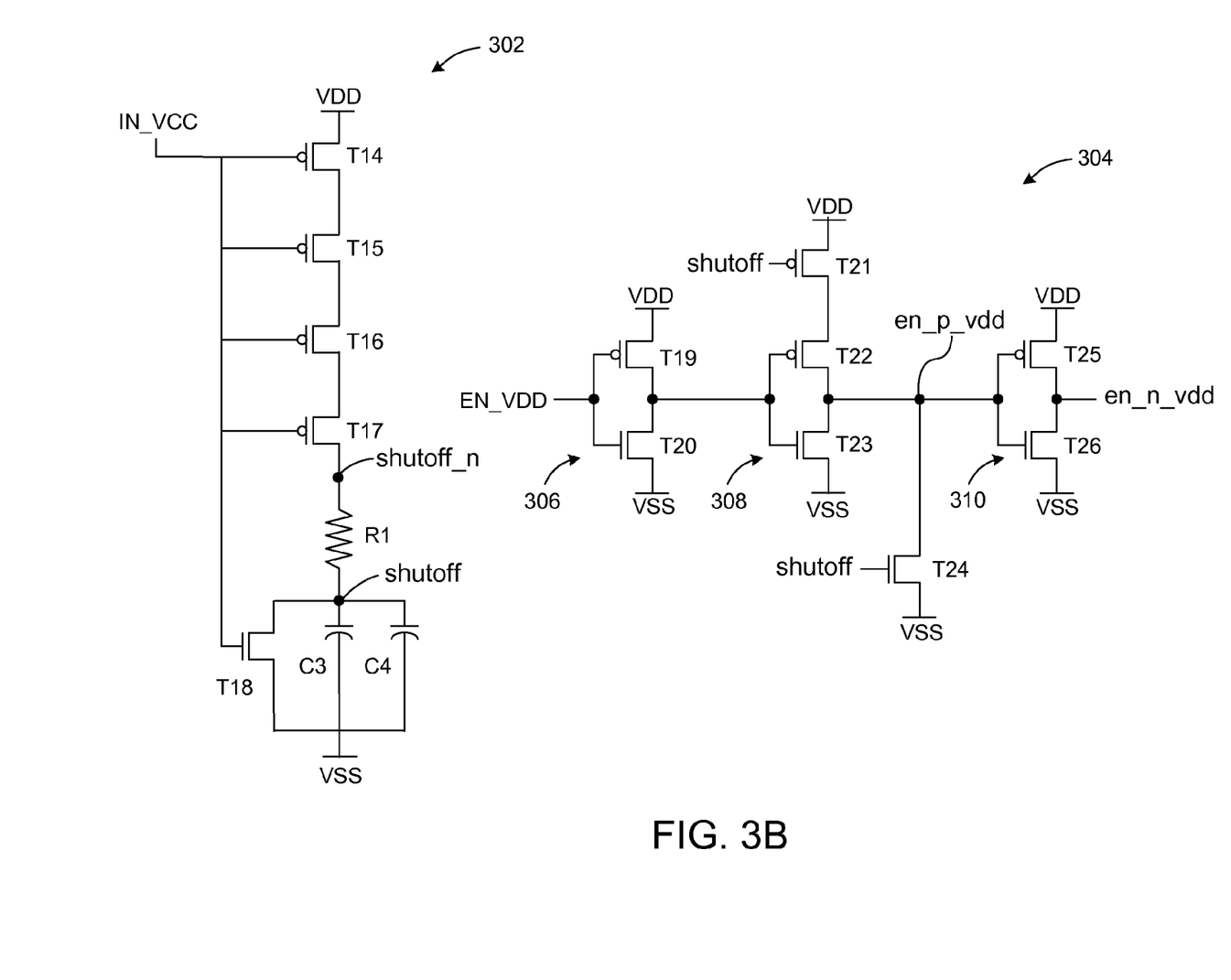

FIGS. 3A and 3B depict an AC level shifter circuit 300 for level shifting a time-varying input signal according to various embodiments. Devices in FIGS. 3A and 3B having the same reference numbers as devices in FIG. 1 may refer to the same or a similar device. The AC level shifter circuit 300 of FIGS. 3A and 3B is similar to the AC level shifter circuit 100 of FIG. 1. However, some of the control signals that the circuit 300 uses differ from the circuit 100. In particular, first transmission gate T0/T1 of circuit 300 is controlled by control signals en_n_vdd (coupled with the gate of T0) and en_p_vdd (coupled with the gate of T1). In addition, second transmission gate T10/T11 of circuit 300 is controlled by control signals en_n_vdd (coupled with the gate of T10) and en_p_vdd (coupled with the gate of T11).

Like the circuit 100, the circuit 300 includes PMOS transistors T4 and T5 and NMOS transistors T6 and T7. The transistors T4, T5, T6, and T7 are serially connected between VDD and VSS, and function as a multiplexer that selects between IN_VCC (post coupling capacitors C1, C2) as one input and IN_ VDD as a second input. However, control signal en_p_vdd (coupled with the gate of T5) and en_n_vdd (coupled with the gate of T6) are used to select one of the two inputs. Another difference is that the circuit 300 does not include the third inverter T14/T15 of the circuit 100. Instead the third inverter T14/T15, the circuit 300 includes sub-circuits 302 and 304 shown in FIG. 3B.

FIG. 3B shows a detection sub-circuit 302 for detecting an idle state on input node N_IN and a control signal generation sub-circuit 304 configured to modify a control signal in response to detection of an idle state on the input node. The detection sub-circuit 302 detects an idle state of the IN_VCC input signal and then breaks the feedback path through resistor R0 between the output and input of the first inverter T8/T9. According to the shown embodiment, the idle state of the IN_VCC input signal is a constant logic low level. In alternative embodiments, the idle state of the IN_VCC input signal is a constant logic high level.

In the example of FIG. 3B, the detection sub-circuit 302 includes capacitors C3 and C4. The detection circuit also includes a PFETs T14, T15, T16, and T17, and an NFET T18. The PFETs T14, T15, T16, and T17 may be referred to as a PFET pull-up stack. The sub-circuit 302 also includes a resistor R1. One terminal of resistor R1 is defined as a "shutoff" node, while the other terminal is defined as a "shutoff_n" node.

The PFET pull-up stack T14, T15, T16, and T17 are serially coupled between VDD and the shutoff n node of resistor R1. The gates of the transistors in the PFET pull-up stack are coupled with the IN_VCC input signal. The gate of NFET T18 is also connected to the IN_VCC input signal. The resistor R1 is connected at the shutoff_n node with a source/drain terminal of T17. The resistor R1 is connected at the shutoff node with capacitors C3 and C4, and a source/drain terminal of NFET T18. The capacitors C3 and C4, and NFET T18 are connected in parallel between the shutoff node and VSS.

When IN_VCC is low, T18 is off, and the PFET pull-up stack and resistor R1 provide a path to pull up the voltage at the shutoff node. When IN_VCC is high, the transistors of the PFET pull-up stack are off, T18 is on and it provides a path to pull down the voltage at the shutoff node.

Still referring to FIG. 3B, the control signal generation sub-circuit 304 includes an inverter 306 constructed from PMOS transistor T19 and NMOS transistor T20, which are serially arranged between VDD and VSS. The input of the inverter T19/T20 is the EN_VDD control signal. The output of the inverter T19/T20 is provided to an inverter 308 constructed from PMOS transistor T22 and NMOS transistor T23. The transistors T22 and T23, and a PMOS transistor T21 are serially arranged between VDD and VSS. The gate of transistor T21, which enables or disables the inverter 308, is coupled with the shutoff node. The output of the inverter 308 is coupled with a source/drain terminal of an NMOS transistor T24 and an input of an inverter 310 constructed from PMOS transistor T25 and NMOS transistor T26. The other source/drain terminal of transistor T24 is coupled to VSS. The gate of transistor T24 is coupled to the shutoff node. The transistor T24 pulls the input to the inverter 310 low when shutoff is high. The transistors T25 and transistor T26 of inverter 310 are serially arranged between VDD and VSS. At the input of inverter 310 is a node that provides control signal en_p_vdd. At the output of inverter 310, T25/T26 is a node that provides control signal en_n_vdd.

The idle detection sub-circuit 302 includes one or more capacitors that are regularly discharged in the presence of a switching IN_VCC input signal. In operation, the discharging of the capacitors C3 and C4 occurs when the IN_VCC input signal is high. When the input signal is high, the transistors of the PFET pull-up stack of the idle detection sub-circuit 302 are off and NFET T18 is on. When T18 is on, the capacitors C3 and C4 discharge via the path through NFET T18 to VSS. As the capacitors discharge, the shutoff node transitions low. When the IN_VCC input signal goes idle low, the transistors of the PFET pull-up stack are on, the NFET T18 is off, and the capacitors C3 and C4 charge up through the resistor R1 and the PFET pull up stack to VDD. As the capacitors charge up, the shutoff node transitions high. As further described below, the rate at which the capacitors C3, C4 charge is relatively slow compared with the rate at which they discharge in various embodiments.

When the shutoff node is low, transistor T21 of the control signal generation circuit 304 is on, and transistor T24 is off. When the transistor T21 is on, inverter T22/T23 is enabled. When transistor T24 is off, it does not influence node en_p_vdd. Accordingly, when the shutoff node is low, en_p_vdd is a copy of EN_VDD. If EN_VDD is high, en_p_vdd is high, and T5 and T6 are off, so that IN_VCC is selected as the input to the level shifter 300. In addition, transmission gates T0/T1 and T10/T11 are enabled.

As the shutoff node transitions high, transistor T21 of the control signal generation circuit 304 turns off, which disables the inverter 308. In addition, as the shutoff node transitions high, the transistor T24 turns on. When the transistor T24 turns on, the node en_p_vdd is pulled low, and the output of inverter 310, en_n_vdd, goes high. Accordingly, when the shutoff node transitions high, en_p_vdd is low. When en_p_vdd is low, T5 and T6 are on, so that IN_VCC is selected as the input to the level shifter 300. In addition, transmission gates T0/T1 and T10/T11 are disabled.

When en_p_vdd is low, en_n_vdd is high, and the transmission gate T10/T11 disabled, the feedback path for the first inverter T8/T9 is broken. With the feedback path broken, node N2_vdd either goes high or low, depending on whether IN_VDD is high or low. In the example waveforms of FIG. 4, IN_VDD is high, so node N3_vdd will transition low at a first time after the input IN_VCC stops switching. With the feedback path broken, the crowbar current in inverter T8/T9 falls toward zero. In an alternative example, IN_VDD may be low.

When the input signal IN_VCC resumes switching, the capacitors C3 and C4 will once again be discharged (the shutoff node will be driven low), and therefore the feedback passgate T10/T11 will again be transparent. Upon this re-enabling the of feedback path, the level shifter 300 will resume operation in level-shifting mode, with IN_VCC as the selected input.

In various embodiments, the rate at which the capacitors C3, C4 charge is relatively slow compared with the rate at which they discharge. The difference in the charge and discharge rates is due to the difference in effective widths of the transistors in the charge and discharge paths. Specifically, the transistors of the PFET pull-up stack are relatively small as compared to the relatively large NFET T18 in pull down path. In addition, the resistance provided by R1 increases the time constant for charging up the capacitors C3 and C4. The difference in the charge and discharge rates allows the level shifter 300 to remain in level-shifting mode for a first time period. If the input is idle for a time period less than the first time period, the level shifter remains in level-shifting mode. It is only when the input is idle for a time period that extends beyond the first period that the level shifter exits the level shifting mode by opening the feedback path. The first time period can be configured for a particular application by selecting appropriate component values and sizes.

Figure 4:
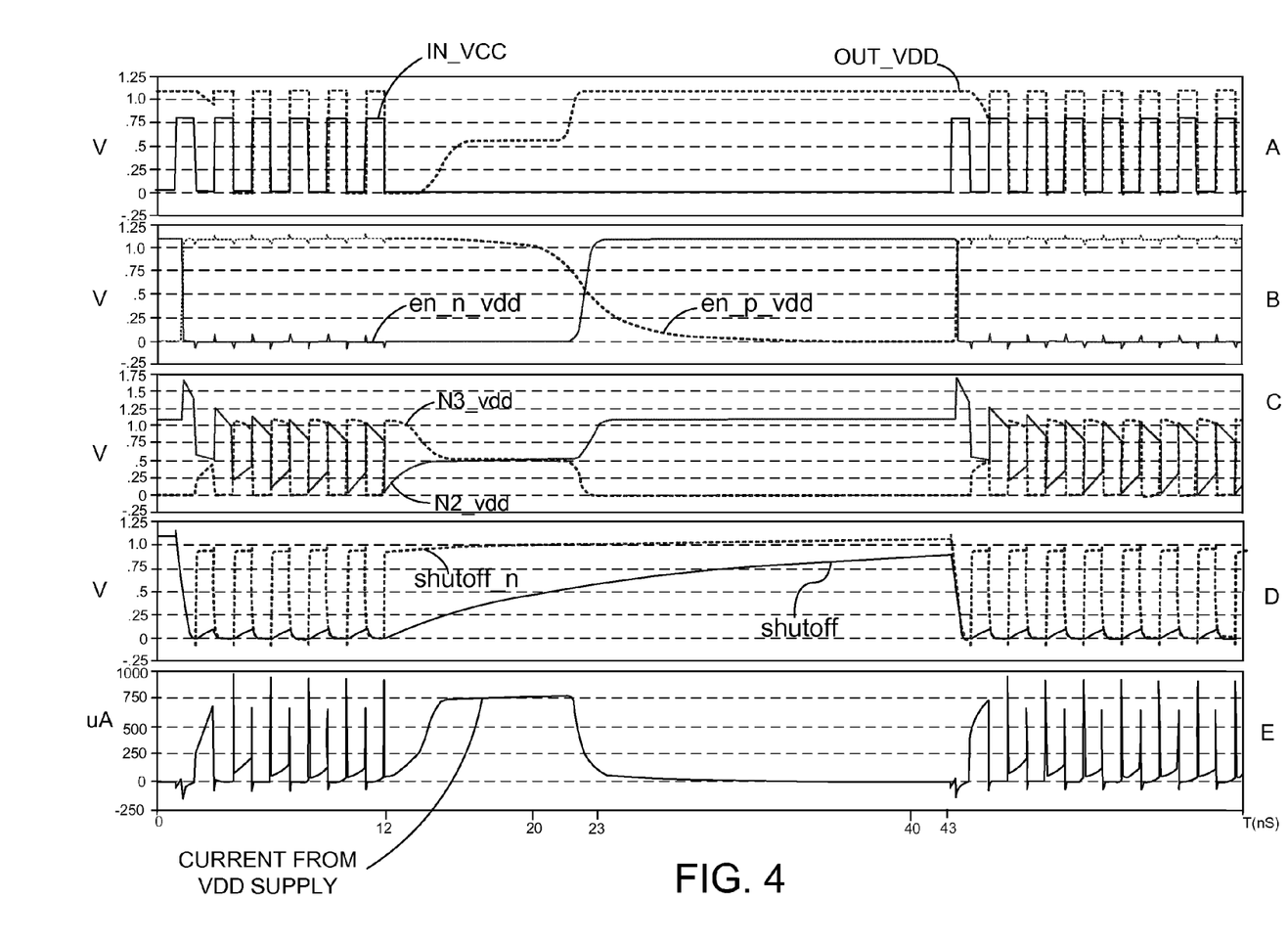
FIG. 4 depicts various waveforms for the circuit of FIGS. 3A and 3B according to various embodiments.

FIG. 4 shows waveforms for a simulation of the level shifter circuit 300, which includes the idle detection sub-circuit 302 and the control signal generation sub-circuit 304. Diagram A of FIG. 4 depicts the input signal IN_VCC and the output signal OUT_VDD. Diagram D of FIG. 4 shows waveforms for shutoff and shutoff_n nodes. It can be seen that the input signal IN_VCC is initially switching, but goes idle at about 12 ns. During the period when IN_VCC is switching, it can be seen in diagram D that the shutoff node slowly rises well under 0.25V and falls back to zero. In diagram A, it can be seen that the input signal IN_VCC goes idle at about 12 ns. When the input goes idle (and IN_VCC is low), diagram D shows that the voltage on the shutoff node rises as capacitors C3 and C4 charge up.

After the input goes idle at about 12 ns, the output signal OUT_VDD initially settles at about VDD/2. At around 20 ns, the shutoff node reaches 0.5V on its transition to a high state. As can be seen in diagram B, the control signal en_n_vdd transitions high and the control signal en_p_vdd transitions low at about 23 ns. It can be seen in diagram A that the output signal OUT_VDD rises to 1.1V at about this time. In addition, as shown in diagram E, current in VDD which rose to 750 μA after the input went idle falls toward zero.

Diagram C of FIG. 4 shows waveforms for node N2_vdd and node N3_vdd. As long as is the input IN_VCC is switching, the voltages on node N2_vdd and node N3_vdd oscillate. When the input IN_VCC is idle, these two nodes settle at about VDD/2. Referring to diagram E, the power supply VDD draws on around 750 μA of current while these nodes are at VDD/2. However, when the control signal en_n_vdd transitions high and the control signal en_p_vdd transitions low at about 23 ns, node N2_vdd goes high, node N3_vdd goes low, and current in the power supply VDD drops toward zero.

The current from the power supply VDD for the examples presented above may be compared. In the waveforms of FIG. 2, the power supply VDD draws around 700 μA of current for about 28 ns. In the waveforms of FIG. 4, the power supply VDD draws around 750 μA of current for about 11 ns. The inventors have performed simulations that show that the average current on VDD in level shifter circuit 100 is 377 uA, whereas the level shifter circuit 300 draws an average current on VDD of 244 uA. This is a 35% reduction in current for a level shifter circuit that is idle about 50% of the time, as shown in the waveforms in FIG. 4. With longer idle times the power savings would increase dramatically.

Figure 5:
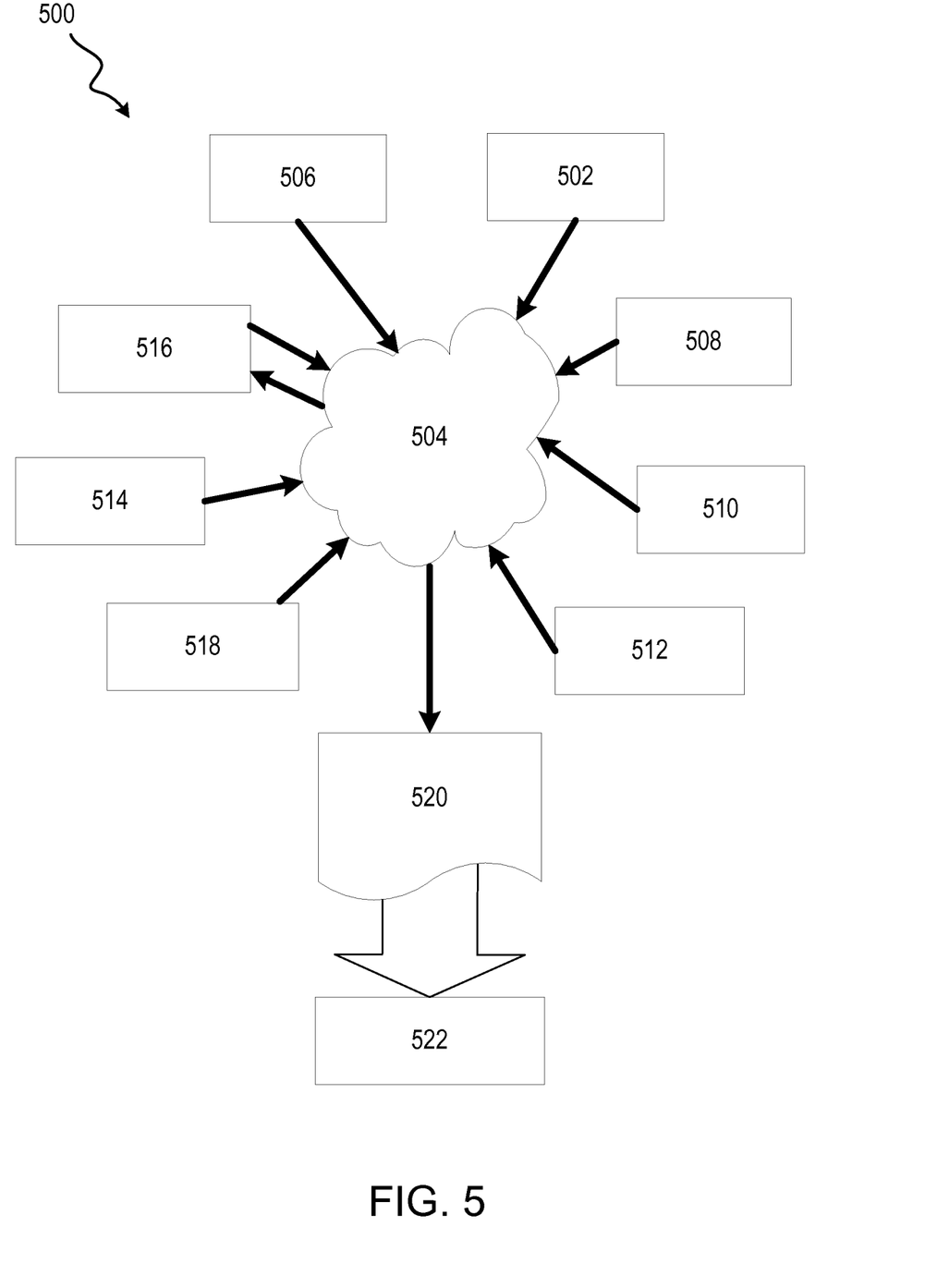
FIG. 5 is a flow diagram of a design process used in semiconductor design, manufacture, or test.

FIG. 5 shows a block diagram of an exemplary design flow 500 used for example, in semiconductor IC logic design, simulation, test, layout, and manufacture. Design flow 500 includes processes, machines and/or mechanisms for processing design structures or devices to generate logically or otherwise functionally equivalent representations of the design structures and/or devices described above and shown in FIGS. 1-4. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system such as those shown in FIGS. 1, 3A, and 3B. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown in FIGS. 1, 3A, and 3B to generate a Netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including Netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-4. In one embodiment, design structure 590 may comprise a compiled, executable HDL simulation model that functionally simulates the devices shown in FIGS. 1, 3A, and 3B.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-4. Design structure 590 may then proceed to a stage 595 where, for example, design structure 590: proceeds to tape-out, is released to manufacturing, is released to a mask house, is sent to another design house, is sent back to the customer, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for coupling a first circuit with a second circuit, the first circuit using a first supply voltage and the second circuit using a second supply voltage, comprising:

determining whether a first time period has elapsed using a capacitive element and a resistive element of a detection sub-circuit coupled with an input node of a level-shifting circuit;

detecting an idle state on the input node of the level-shifting circuit, the idle state being a state that corresponds with a particular binary logic value and which is maintained for a time period that exceeds the first time period; and opening a feedback path of the level-shifting circuit when the detection sub-circuit of the level-shifting circuit detects the idle state on the input node, wherein the level-shifting circuit includes a first inverter that uses the second supply voltage, the first inverter having an input and an output;

wherein the feedback path is between the input and output of the first inverter and includes a first transmission gate to open or close the feedback path.

2. The method of claim 1, wherein the capacitive element of the detection sub-circuit maintains a substantially uncharged state when the input signal switches between a binary logic value and a complementary binary logic value in a time period within the first time period, and transitions to a substantially charged state when the input signal maintains the particular binary logic value for a time period that exceeds the first time period.

3. The method of claim 1, wherein the first time period corresponds with a time period to charge up the capacitive element to a particular voltage level and a time period to discharge the capacitive element is less than the first time period.

4. The method of claim 1, wherein the particular binary logic value is a logic zero.

5. The method of claim 1, wherein the opening of the feedback path of the level-shifting circuit includes opening the first transmission gate.

6. The method of claim 1, further comprising closing the feedback path of the level-shifting circuit when the detection sub-circuit detects that the input node switches from one binary logic value to a complimentary binary logic value in a time period within the first time period.

* * * * *